(12) United States Patent
Knowles et al.

(10) Patent No.: US 10,551,238 B2
(45) Date of Patent: Feb. 4, 2020

(54) ULTRASONIC LEVEL SENSOR FOR AERATED FLUIDS

(75) Inventors: Terence J. Knowles, Glenview, IL (US); Brian J. Truesdale, Glenview, IL (US); Kenneth A. Albrecht, Glenview, IL (US); Charles F. Bremigan, III, Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 1426 days.

(21) Appl. No.: 13/884,553

(22) PCT Filed: Oct. 20, 2011

(86) PCT No.: PCT/US2011/057094
§ 371 (c)(1),
(2), (4) Date: May 9, 2013

(87) PCT Pub. No.: WO2012/067748
PCT Pub. Date: May 24, 2012

(65) Prior Publication Data
US 2013/0220012 A1 Aug. 29, 2013

Related U.S. Application Data

(60) Provisional application No. 61/415,214, filed on Nov. 18, 2010.

(51) Int. Cl.
*G01F 23/00* (2006.01)
*G01F 23/296* (2006.01)

(52) U.S. Cl.
CPC ........ *G01F 23/296* (2013.01); *G01F 23/2967* (2013.01)

(58) Field of Classification Search
CPC .. G01F 23/2962; G01F 23/284; G01F 23/296; G01F 23/2961

(Continued)

(56) References Cited

U.S. PATENT DOCUMENTS 4,499,765 A 2/1985 Benz et al.
5,159,838 A * 11/1992 Lynnworth ............... B06B 3/00
73/644

(Continued)

FOREIGN PATENT DOCUMENTS

DE 102008003283 A1 7/2009
EP 0940658 A1 9/1999

(Continued)

OTHER PUBLICATIONS

International Search Report and Written Opinion corresponding to PCT/US2011/057094, dated Jun. 26, 2012.

*Primary Examiner* — Justin Seo
*Assistant Examiner* — Rodney T Frank
(74) *Attorney, Agent, or Firm* — Levenfeld Pearlstein, LLC

(57) ABSTRACT

An ultrasonic sensor for detecting the presence or absence of an aerated fluid includes a probe having a first solid portion and a second hollow portion. The probe has a closed end at the hollow portion. The solid portion and the hollow portion define an interface therebetween. A transducer element is mounted to the probe at about the solid portion. The transducer element is configured to transmit an ultrasonic signal through the solid portion into the hollow portion and to receive reflections of the ultrasonic signal to determine the presence or absence of a fluid and/or an aerated fluid.

16 Claims, 3 Drawing Sheets

(58) Field of Classification Search
USPC .......................................................... 73/290 V
See application file for complete search history.

(56) References Cited

U.S. PATENT DOCUMENTS

| | | |
|---|---|---|
| 6,272,921 B1 | 8/2001 | Ivanovich et al. |
| 2007/0186646 A1 | 8/2007 | Frick et al. |
| 2010/0024543 A1* | 2/2010 | Knowles ............. G01F 23/2961 73/290 V |
| 2010/0257931 A1* | 10/2010 | Partington .......... G01F 23/2961 73/290 V |
| 2011/0132084 A1 | 6/2011 | Kielian |

FOREIGN PATENT DOCUMENTS

| | | |
|---|---|---|
| WO | 2008089209 A2 | 7/2008 |
| WO | 2010016997 A1 | 2/2010 |

\* cited by examiner

ULTRASONIC LEVEL SENSOR FOR AERATED FLUIDS

CROSS-REFERENCE TO RELATED APPLICATION DATA

This application is a National Phase of International Application Number PCT/US2011/057094, filed Oct. 20, 2011, and claims the benefit of priority of Provisional U.S. Patent Application Ser. No. 61/415,214, filed Nov. 18, 2010.

BACKGROUND

The present invention is directed to a sensing device. More particularly, the present invention pertains to a sensing device used to detect the presence or absence of a fluid even when that fluid is aerated.

Level sensors are known in the art. Various types of mechanical, electro-mechanical and electrical sensors are known, and the type of sensor used for any given application will depend upon the application Fluid level can be determined using, for example, magnetic sensors, float sensors, optical sensors, ultrasonic sensors and the like. Sensors, such as those disclosed in Knowles, U.S. Publication 2010/0024543, and WO 2008/089209, both commonly assigned with the present application, and incorporated herein by reference, use an elongated probe with a transducer operably connected thereto. The transducer is configured to produce compression waves in the probe and circuitry for detecting acoustic energy that is emitted into the liquid when liquid is in contact with the probe.

While such a probe sensor functions well in certain applications, such as discrete water level detection, it does not function well in fluids that may be aerated.

Another type of sensor is a double probe sensor in which the transducer and receiver functions are provided in separate elements (e.g., probes). However, aerated fluid detection is problematic here as well, due to the acoustic waves being scattered by the trapped air bubbles, which effectively block the propagation and detection of the waves.

Accordingly, there is a need for a level sensor that is capable of detecting fluid level in aerated systems.

BRIEF SUMMARY

An ultrasonic sensor is configured for detecting the presence or absence of an aerated fluid. The sensor includes a probe having a first solid portion and a second hollow portion. The probe has a closed end at the hollow portion. The solid portion and the hollow portion define an interface therebetween.

A transducer element is operably connected to the probe at about the solid portion. The transducer element is configured to transmit an ultrasonic signal through the solid portion into the hollow portion and to receive reflections of the ultrasonic signal to determine the presence or absence of a fluid and/or an aerated fluid.

The end of the hollow portion is closed, defining closed end. The closed end can be formed by, for example, a cap or a closed-end tube that is press-fit, glued, threaded, a combination of these, or the like. In one embodiment, the transducer element is a compression-type transducer.

The sensor can include a flange at an end of the solid portion distal from the hollow portion. A temperature sensor can be operably connected to the probe, if desired.

In one embodiment, the probe is formed as a rod with a lower portion of the rod hollowed. A retaining ring can be disposed on an outer surface of the rod at the interface between the solid portion and the hollow portion.

The probe can be formed as a rod having a hollowed out bottom portion having a cap thereon. Alternately, the rod can be formed as a multi-section element, in which a solid upper section is joined to a hollowed, closed end lower section, such as by threading, press-fitting or the like.

The sensor can be positioned in a housing, such that the solid portion of the probe is mounted within the housing and the hollow portion of the probe depends from and is outside of the housing.

A present probe is formed from aluminum and has a relatively thin wall thickness at the hollow portion.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION

Figure 1:
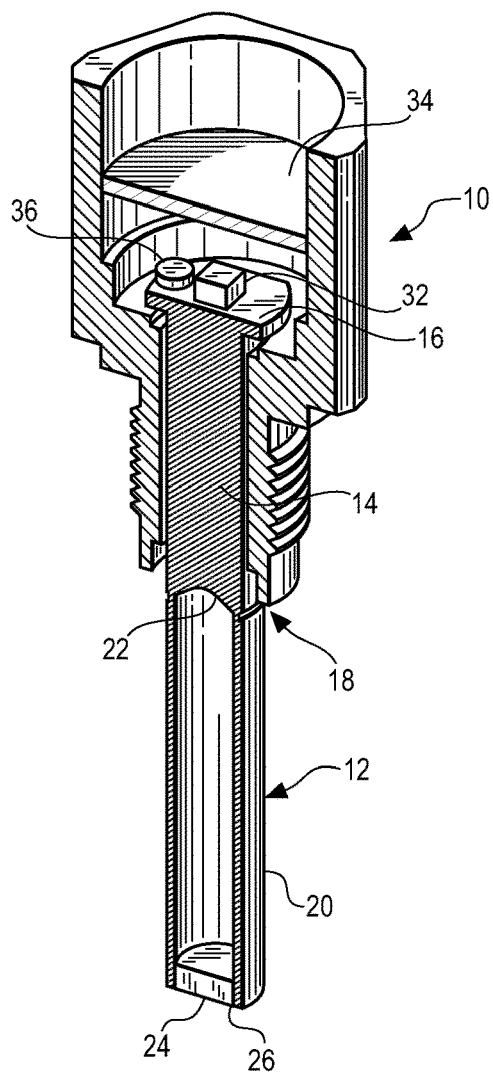
FIG. 1 is a perspective sectional view of an ultrasonic liquid sensor in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 2:
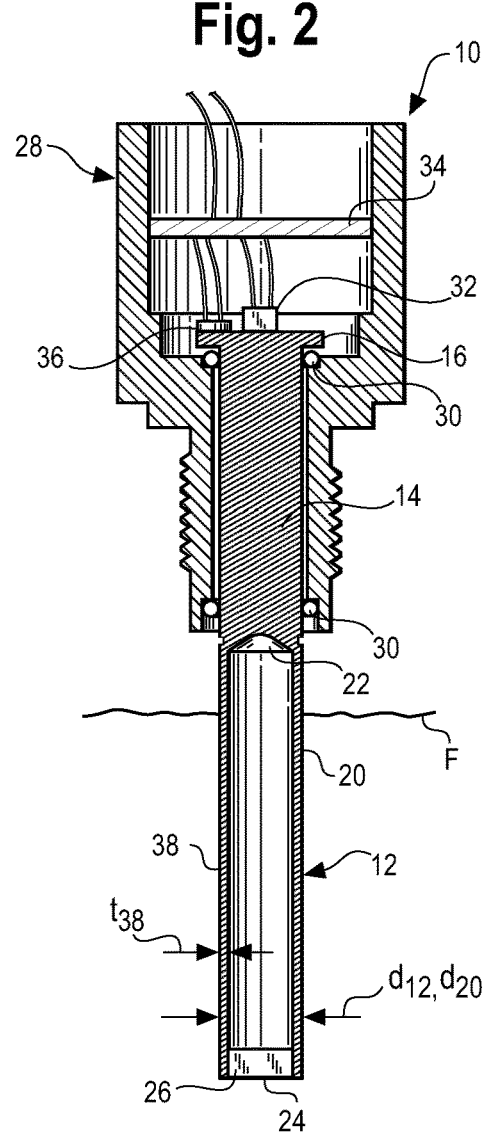
FIG. 2 is a side sectional view of the level sensor.

Referring now to the figures and in particular to FIGS. 1 and 2, there is shown an exemplary embodiment of an ultrasonic level sensor 10 ("sensor"). The sensor 10 includes a rod or probe 12. The rod 12 includes an upper end 14 which, in the illustrated embodiment includes a grounding flange 16. It will be appreciated that the grounding flange 16 is intended to facilitate mounting the rod 12 and is not necessary to operation of the sensor 10.

The rod 12, from the upper end 14 (the grounding flange 16) to an intermediate portion 18 is solid. The portion 20 of the rod 12 from the opposite or free end 26 to the intermediate portion 18 ring is a hollow portion 20 and defines an interface 22 therebetween the solid 14 and hollow (or lower) 20 portions. The lower portion 20 is closed-off to the environs. Closure can be accomplished by a cap 24 that is positioned on the free end 26 of the hollow portion 20 to maintain the interior of the probe (the hollow portion 20) dry. In a present sensor 10, the rod 12 has a diameter $d_{12}$ of about 0.3125 inches (5/16 inch) and the hollow portion 20 has a wall 38 thickness $t_{38}$ of about 0.030 inches (30 mils) The upper end 14 of the rod 12 remains dry in use, while the lower end 20 is or can be immersed in fluid F. It will be appreciated from the present disclosure that other rod 12 diameters, lengths and hollow portion 20 wall thicknesses and the like can be used to achieve desired characteristics and that such other diameters, lengths and wall thicknesses and the like are within the scope and spirit of the present disclosure.

The solid portion 14 of the rod 12 is mounted in a housing 28. The rod 12 can be isolated from the housing 28 by for example, O-rings 30, a grommet or the like. A transducer 32, for example, a piezoelectric transducer is bonded to the rod 12, at about the upper end 14. In a present sensor 10, the transducer 32 is mounted to the flange 16. However, it will be appreciated by those skilled in the art that the transducer 32 can be mounted a various locations on the rod 12.

The transducer 32 is of the compression or radial mode type. Electrical circuitry may be positioned in the housing, for example, as part of a circuit board 34 or the like, for providing power and/or signals to and from the sensor 10.

In a present sensor a thermistor 36 or other temperature sensor is also mounted at about the upper end 14 of the sensor rod 12. As illustrated, the thermistor 36 is mounted to the flange 16. The thermistor 36 can, however, be mounted at other locations within the sensor 10, which other locations will be appreciated by those skilled in the art.

In use, extensional (compression) waves are generated by the transducer 32 that propagate through the solid portion 14 of the rod 12 and through the lower or hollow portion 20. The waves then propagate back up through the lower portion 20 and upper portion 14 to the transducer 32. In a present sensor 10, the transducer 32 is excited at frequency of about 208 kHz. It will be appreciated that other excitation frequencies can be used.

The hollow section 20 is more sensitive to viscous loses due to the lower mass (thin wall 38) of that section 20 compared to the solid upper section 14. In addition, absorption loses at the solid section 14, for example, due to the O-rings/grommets 30 or mounting to the housing 28, are less because the solid section 14 is less sensitive than the hollow section 20 (again, due to the lower overall mass of the hollow section 20).

In a present sensor 10, the rod 12 is formed from aluminum, which, because of is light weight has been found to successfully function in the present sensor 10. In addition, because aluminum is a good thermal conductor, and the path between the fluid F and the thermistor 36 is short, the temperature of the fluid F is readily determined Those skilled in the art will recognize that other materials can be used, which other materials are within the scope and spirit of the present disclosure.

Figure 3:
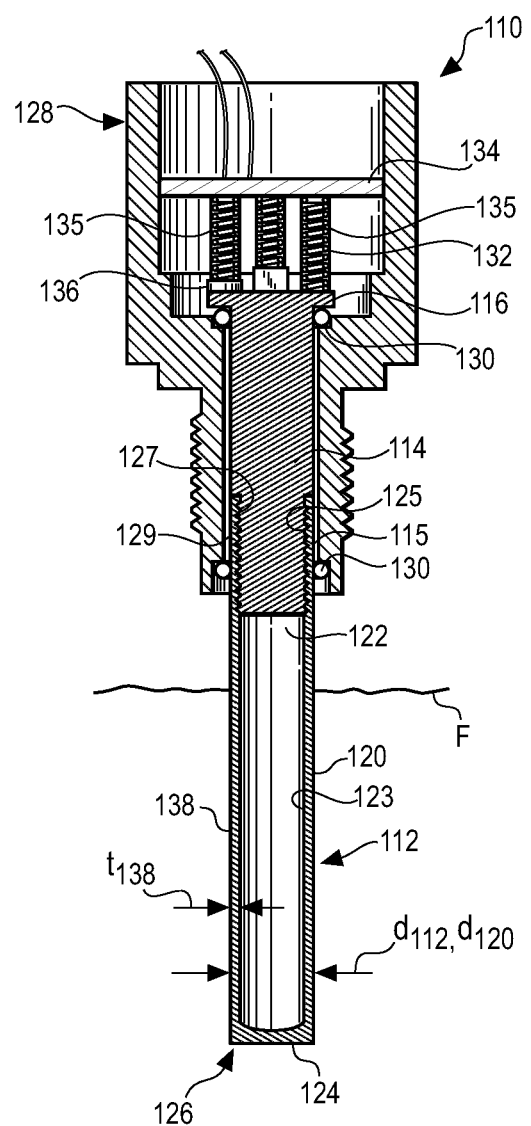
FIG. 3 is a side sectional view of an alternate embodiment of the sensor.

An alternate embodiment of the sensor 110 is illustrated in FIG. 3. The sensor 110 functions in the same manner as that illustrated in FIGS. 1-2. In this embodiment, the rod 112 includes an upper end 114 which includes a grounding flange 116. This embodiment is a two-piece rod 112 in which the upper end 114 is solid and threads into the lower end 120. The lower end 120 is a hollow tube having a closed off end 124. In the illustrated embodiment the lower end 120 is a hollowed out element, for example, a tube having a bore that extends to, but not through the end 124, thus forming a thin-walled, closed off tube. The upper end 115 of the tube 120 has a thread 125 to mate with the thread 127 on the upper end 114. Alternately configurations for joining the hollow lower portion 120 with the solid upper portion 114, such as by press-fit, glue, the illustrated threads or a combination of these, or by other means, will be recognized by those skilled in the art. It will also be appreciated by those skilled in the art that the juncture or joint 129 of the upper 114 and lower 120 sections is within the housing 128 and is thus further protected from infiltration (as by leakage) in that it is above the seals 130 that seal the probe 112 to the housing 128.

This embodiment also illustrates a configuration in which the upper end 114 is mounted to the circuit board 134 by springs 135 that extend between, for example, the transducer 132 and the board 134, the thermistor 136 and the board 134, and the flange 116 and the board 134. The springs 135 provide the necessary electrical connections between the transducer 132 and the board 134, the thermistor 136 and the board 134, and the flange 116 and the board 134, and further serve to mount the probe 112 in the housing 128. The springs 135 provide for electrical and mechanical (physical) isolation of the probe 112 from the housing 128.

Functionally, the solid/hollow interface 22, 122 provides a wave reflective interface. Due to the rod 12, 112 dimensions, the transducer 32, 132 receives several reflective passes from this interface 22, 122 before the waves from the hollow section 20, 120 appear at the transducer 32, 132. As such, in viewing the response time, the response can be viewed in air and in fluid and the response times compared to determine the difference, to eliminate variations in the transducer response due to bonding, temperature, aging and the like.

It has been observed that the aluminum rod 12, 112 coupled with the compression mode type transducer 32, 132 provides outstanding aerated liquid or fluid level indication.

Tests were conducted to determine the effectiveness of the sensor 10 in aerated hydraulic fluid (oil) and air. The hydraulic fluid was a John Deere 20D hydraulic fluid at 95° C. The fluid was aerated by agitating (shaking) the fluid until it appeared as a milky-white fluid.

Figure 4:
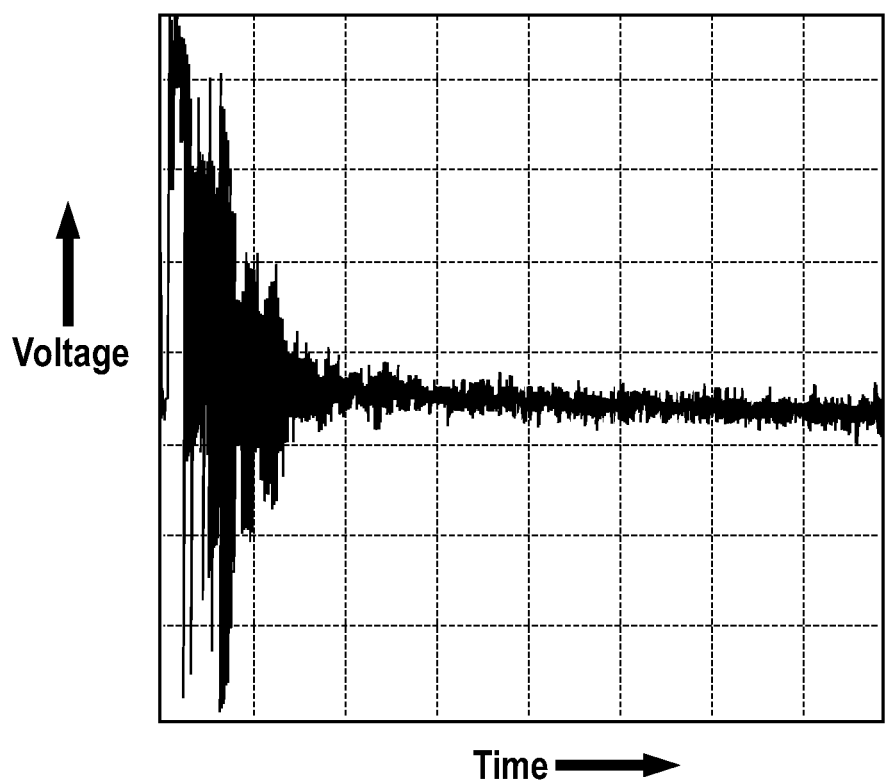
FIG. 4 is a plot of the response spectra in voltage vs. time for the sensor in air (out of fluid)
Figure 5:
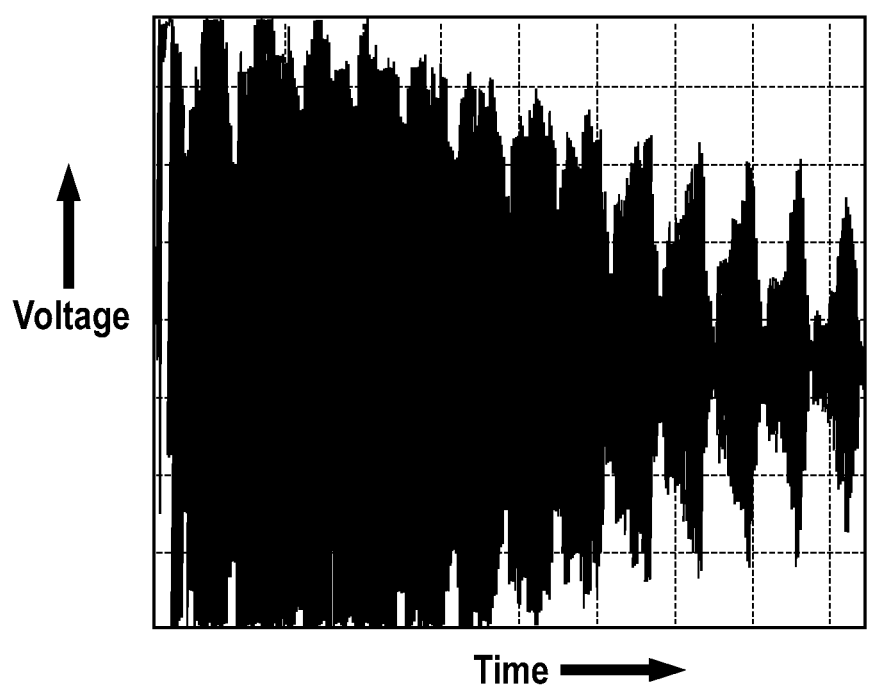
FIG. 5 is a plot of the response spectra in voltage vs. time for the sensor in aerated fluid (hydraulic oil).

The response spectra (voltage vs. time) for in air (out of fluid) and in aerated fluid are shown in FIGS. 4 and 5, respectively. As can be seen, the response spectra for the aerated fluid is substantially distinguishable from that in air. The difference at 95° C., which is a worst-case scenario in that the energy losses are essentially due to viscous losses which decrease with temperature, is very pronounced between the aerated fluid and air.

This, again, is believed to be due to the increased sensitivity of the lower mass (thin-walled 38, 138) lower portion 20, 120 of the rod 12, 112, and the surface area of the rod 12, 112 compared to the higher mass upper rod portion 14, 114. It will be appreciated by those skilled in the art that because the sensitivity of the sensor increases with decreased wall 38, 138 thickness $t_{38}$, $t_{138}$, and because the sensitivity increases with increased surface area of the probe, generally, a larger diameter $d_{20}$, $d_{120}$ a longer hollow section 20, 120 and a smaller wall 38, 138 thickness $t_{38}$, $t_{138}$ will provide a more sensitive and responsive sensor 10, 110.

Although the present disclosure is directed to a probe 12, 112 formed as a rod that is partially hollow and closed (capped) at the hollow free end 26, 126 it is anticipated that any of a wide variety of shapes of probes 12, 112 that are partially hollow and have hollow/solid interface 22, 122 configurations can be used. All such various configurations and shapes are within the scope and spirit of the present disclosure.

The advantages of the present ultrasonic liquid sensor 10, 110 will be appreciated by those skilled in the art. The sensor 10, 110 provides a cost-effective assembly and method for determining the presence or absence of an aerated liquid or fluid F in a system. The present sensor 10, 110 uses a single probe 12, 112 configuration, eliminating the need for double probes and the like. The present sensor 10, 110 is easy to install and maintain and can additionally be used to determine other fluid F system characteristics, such as temperature and viscosity.

All patents referred to herein, are incorporated herein by reference, whether or not specifically done so within the text of this disclosure. In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. An ultrasonic sensor for detecting the presence or absence of an aerated liquid, comprising:
    a housing;
    a probe having a first solid portion and a second hollow portion, the solid portion including a flange at an end distal from the hollow portion for mounting the probe in the housing, the probe having a closed end at the hollow portion, the solid portion and the hollow portion defining an interface therebetween, wherein the solid portion of the probe is mounted at least in part within the housing, and wherein the hollow portion of the probe depends from and is outside of the housing;
    a transducer element mounted on the flange, the transducer element configured to transmit an ultrasonic signal through the solid portion into the hollow portion, the transducer element further configured to receive reflections of the ultrasonic signal to determine the presence or absence of a liquid in an aerated state; and
    a circuit board in the housing, the circuit board electrically connected to the transducer,
    wherein the probe is mounted in the housing by at least one isolating element between the housing and the probe to isolate the probe from the housing, wherein the at least one isolating element includes two isolating elements spaced apart along a length of the probe, wherein one of the isolating elements is disposed between the flange and a portion of the housing, and
    wherein the hollow portion has a wall thickness, and a surface area provided by an outer diameter and a length, wherein the wall thickness, the outer diameter and the length are dimensioned such that the ultrasonic signal reflected through the hollow portion and received by the transducer provides a voltage versus time response spectra, and the presence or absence of the aerated liquid is determined based on the response spectra.

2. The ultrasonic sensor of claim 1 wherein a cap is positioned at about an end of the hollow portion to define the closed end.

3. The ultrasonic sensor of claim 1 including a temperature sensor mounted on the flange.

4. The ultrasonic sensor of claim 1 wherein the probe is formed as a rod.

5. The ultrasonic sensor of claim 1 including a ring disposed on an outer surface of the rod at the interface between the solid portion and the hollow portion.

6. The ultrasonic sensor of claim 1 wherein the probe is formed from aluminum.

7. The ultrasonic sensor of claim 6 wherein the probe has a diameter of about 0.3125 inches and the hollow portion has a wall thickness of about 0.030 inches.

8. The ultrasonic sensor of claim 1 wherein the probe is formed with the first and second portions integral with one another.

9. The ultrasonic sensor of claim 8 wherein the probe is formed as a rod, and wherein the second portion is a hollowed out portion of the rod.

10. The ultrasonic sensor of claim 1 wherein at least one of the two isolating elements is an O-ring.

11. The ultrasonic sensor of claim 1 including one or more springs extending between the circuit board and the flange for electrically connecting the transducer to the circuit board and mechanically isolating the probe from housing.

12. The ultrasonic sensor of claim 1 wherein the probe is formed from multiple sections joined to one another.

13. The ultrasonic sensor of claim 1 wherein the probe is formed from multiple sections at a joint, and wherein the joint is positioned within the housing.

14. The ultrasonic sensor of claim 13, wherein at least one of the two isolating elements is a seal positioned between the probe and the housing and wherein the joint is positioned between the seal and the transducer element.

15. The ultrasonic sensor of claim 1, wherein the presence or absence of an aerated liquid is detected along a length of the hollow portion.

16. The ultrasonic sensor of claim 1, wherein the interface is a wave reflective interface and the received reflections of the ultrasonic signal include reflections received from the interface and reflections received from the hollow portion, wherein reflections received from the interface are received before reflections received from the hollow portion and a response time of the reflections from the interface is determined.

* * * * *